A. J. RODRIGUEZ.
VEHICLE WHEEL.
APPLICATION FILED APR. 5, 1913.

1,128,724.

Patented Feb. 16, 1915.
2 SHEETS—SHEET 1.

WITNESSES

INVENTOR
Alex J. Rodriguez
his Attorney

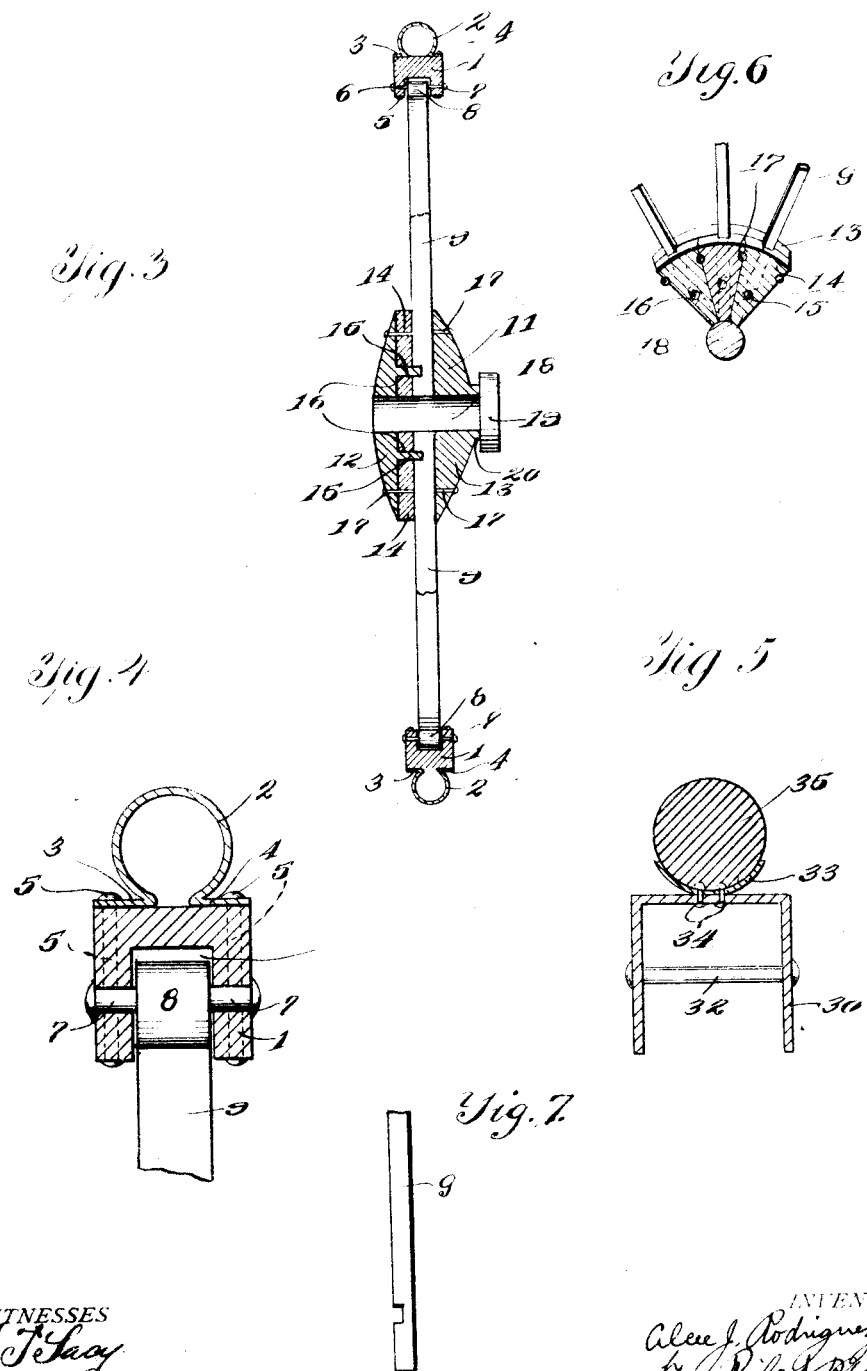

UNITED STATES PATENT OFFICE.

ALCEE J. RODRIGUEZ, OF WHITE CASTLE, LOUISIANA.

VEHICLE-WHEEL.

1,128,724.   Specification of Letters Patent.   Patented Feb. 16, 1915.

Application filed April 5, 1913. Serial No. 759,143.

*To all whom it may concern:*

Be it known that I, ALCEE J. RODRIGUEZ, a citizen of the United States, residing at White Castle, in the parish of Iberville and State of Louisiana, have invented certain new and useful Improvements in Vehicle-Wheels, of which the following is a specification.

This invention relates generally to vehicle wheels and more particularly to improvements in that type of wheel known as resilient wheels wherein the rim or felly is yieldably supported from a wheel hub.

An object of this invention is to improve the construction of wheels, to provide a simple and highly resilient shock-absorbing wheel of great strength and durability, designed for use on various kinds of vehicles, such as automobiles or the like, and adapted to afford the desired resiliency to adapt it for the use to which it is applied, and one capable of use in connection with any kind of tire.

Another object of this invention is to provide a novel means for connecting the resilient spokes of the wheel to the rim and the hub of the wheel whereby to yieldably hold them in the proper relation, one with the other, and to generally simplify and improve the construction of wheels of this type.

With the foregoing and other objects in view, this invention consists in such novel features of construction, combination and arrangement of parts, as will be hereinafter more fully described, illustrated in the accompanying drawing and claimed.

Figure 1:
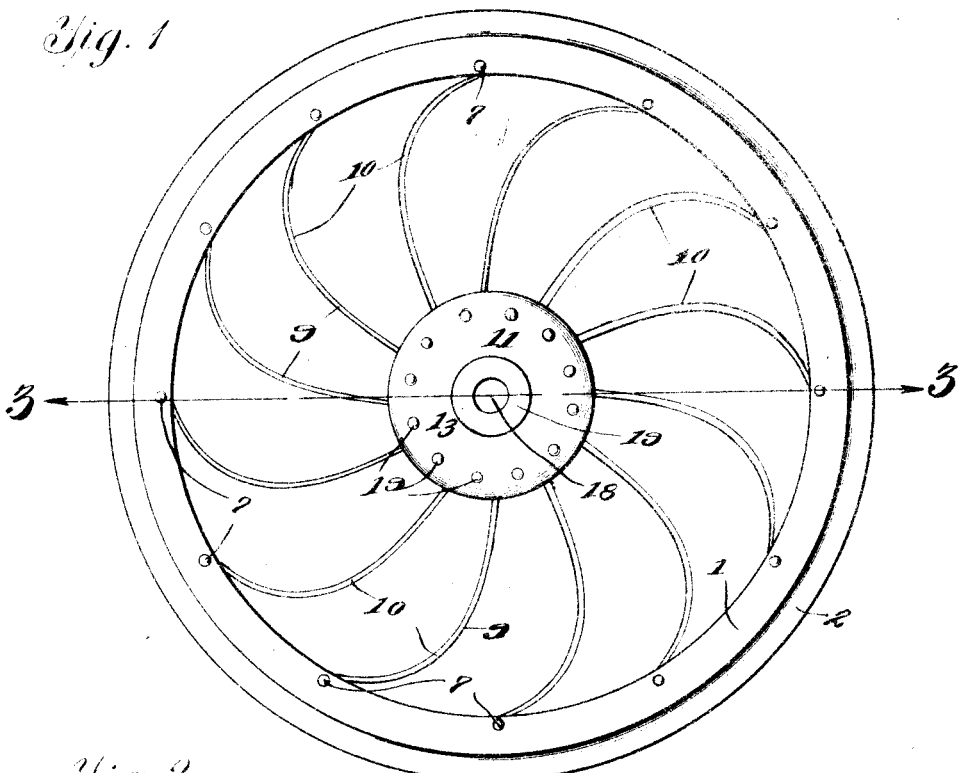
Figure 2:
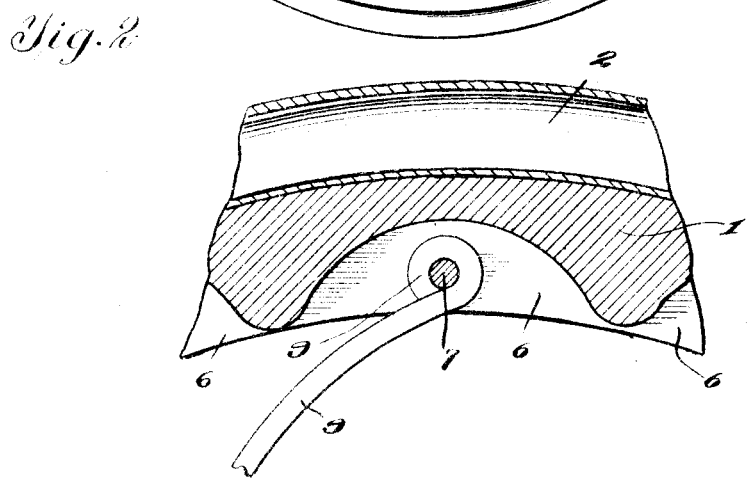

In describing the invention in detail, reference will be had to the accompanying drawings wherein like characters of reference designate like or corresponding parts throughout the several views, and in which, Figure 1 is a side elevation of the improved wheel; Fig. 2 is a fragmentary sectional view of the felly of the wheel, showing the manner of connecting the resilient spokes thereto; Fig. 3 is a sectional view on the line 3—3 of Fig. 1; Fig. 4 is a detail cross sectional view of the wheel rim; and Fig. 5 is a detail cross sectional view of a modified form of the wheel rim. Fig. 6 is a detail sectional view of a portion of the hub, Fig. 7 is a detail view of one of the leaf springs.

In referring to the drawing by numeral, 1 designates the felly or wheel rim which has the tire 2 securely mounted upon its periphery. The tire 2 is shown in the drawings as a hollow metallic tube, having its ends 3 and 4 bent outwardly and securely fastened to the periphery of the wheel by means of any suitable fastening means, such as the bolts 5 which pass entirely through the felly 1 and are held securely in place by either riveting or upsetting one end thereof.

The felly 1 of the wheel is provided with semicircular cut-out portions 6 extending inwardly from its inner surface, as is shown in Figs. 2 and 4 of the drawings, and rods 7 extend laterally through the cut-out portions 6, being centrally located therein and rigidly and firmly seated in the felly 1 of the wheel. These rods 7 have the upper ends 8 of the flat or leaf springs 9 bent or curved thereabout, the extreme end of the springs contacting with one surface of the same, as is clearly illustrated in Fig. 2. The springs 9 serve the purpose of the ordinary spokes of a wheel, and are curved, as is shown at 10, extending inwardly into the hub portion 11 of the wheel.

The hub portion of the wheel is formed of two plates 12 and 13, and a plurality of blocks 14. The plates 12 and 13 being placed upon opposite sides of the springs 9 the blocks 14 are disposed about the bore and contact with the plates 12 and 13 whereby to hold them apart and to provide a substantial base therefor, the blocks 14 which are provided with recesses extending laterally therein for the reception of the springs 9. The plate 12 has a plurality of inwardly-extending lugs 15 which enter recesses 16 in the blocks 14, and passing therethrough, engage the sides of the springs 9 in securely holding the latter in their proper position. The two plates 12 and 13 and the blocks 14 are securely held in their proper relation one with the other by means of bolts 17 which pass laterally therethrough. The hub portion 11 has the ordinary bore 18 for the reception of the axle of any desired vehicle, and a collar 19 is shown mounted upon the outer end of an extension 20 which is formed upon the member 13.

In Fig. 5 of the drawings a modified form of tire and means for attaching the same to the felly 1 are shown. This modified form constitutes a casing 30 which is constructed of any desirable type of metal and shaped so as to engage the outer surfaces, constituting the sides and outer edge or periphery of the felly and is securely held thereon by means of rivets 32; a member 33 which forms a segment of a circle in cross section and which is securely attached or mounted upon the outer surface of the casing 30 by means of rivets 34; and a tire 35. The tire 35 is preferably constructed of rubber or some pliable material to aid the springs 9 in absorbing the shocks occasioned by the driving of the vehicle.

The modified form shown in Fig. 5 is adapted to be used in connection with light vehicles wherein the weight of the same will not be sufficient to cause a wheel of this type, having a metallic tire, to respond effectively to the shocks.

In practical fields, certain minor features of construction, combination and arrangement of parts may necessitate alterations to which the patentee is entitled, provided such alterations are comprehended within the scope of what is claimed.

What is claimed is:—

1. In a vehicle wheel the combination with a hub of a plurality of spokes, said hub comprising a plurality of recessed blocks, springs seated within said recesses, a plate having lugs formed thereon adapted to pass through said blocks to engage the sides of said springs whereby to hold said springs in engagement with said hub.

2. In a vehicle wheel the combination with a hub of a plurality of spring spokes laterally recessed adjacent the inner ends, said hub comprising a plurality of blocks laterally recessed, springs having their ends seated within said recesses, a plate having inwardly extending lugs formed thereon adapted to pass through said blocks to rigidly engage the recesses on the inner ends of said springs whereby to hold said springs in engagement with said hub, a second plate and means for securing said plates and said blocks securely in place with respect to each other.

In testimony whereof I affix my signature in presence of two witnesses.

ALCEE J. RODRIGUEZ.

Witnesses:
CLEBERT J. RODRIGUEZ,
JULES A. CORVILLE.